US 7,809,238 B2

(12) United States Patent
Fujinami

(10) Patent No.: US 7,809,238 B2
(45) Date of Patent: Oct. 5, 2010

(54) AFTER-RECORDING METHOD AND APPARATUS FOR DIGITAL RECORDING MEDIUM AND REPRODUCTION METHOD AND APPARATUS FOR THE DIGITAL RECORDING MEDIUM

(75) Inventor: Yasushi Fujinami, Tokyo (JP)

(73) Assignee: Sony Corporation, Tokyo (JP)

( * ) Notice: Subject to any disclaimer, the term of this patent is extended or adjusted under 35 U.S.C. 154(b) by 1728 days.

(21) Appl. No.: 10/269,360

(22) Filed: Oct. 11, 2002

(65) Prior Publication Data
US 2003/0113095 A1 Jun. 19, 2003

Related U.S. Application Data

(63) Continuation of application No. 09/297,340, filed on Jul. 15, 1999, now Pat. No. 6,526,217.

(51) Int. Cl.
*H04N 5/91* (2006.01)
*H04N 7/26* (2006.01)
(52) U.S. Cl. .................................. 386/46; 386/124
(58) Field of Classification Search .................. 386/46; 358/337, 341, 342
See application file for complete search history.

(56) References Cited

U.S. PATENT DOCUMENTS

| 4,348,698 | A |   | 9/1982 | Schoman |
| 4,862,439 | A | * | 8/1989 | Ando et al. ............... 369/30.04 |
| 5,315,401 | A | * | 5/1994 | Okada et al. ................. 386/104 |
| 5,424,850 | A | * | 6/1995 | Inoue et al. .................. 386/100 |
| 5,499,106 | A | * | 3/1996 | Arano et al. ................. 386/104 |
| 5,537,578 | A |   | 7/1996 | Day, III et al. |
| 5,629,740 | A | * | 5/1997 | Tanaka et al. ............... 348/515 |
| 5,758,007 | A | * | 5/1998 | Kitamura et al. .............. 386/45 |
| 6,052,241 | A |   | 4/2000 | Teranishi |
| 6,175,683 | B1 | * | 1/2001 | Sugimura et al. ............. 386/95 |

FOREIGN PATENT DOCUMENTS

| JP | 6-205354 | 7/1994 |
| JP | 7-130088 | 5/1995 |
| JP | 10-126739 | 5/1998 |

\* cited by examiner

*Primary Examiner*—Marsha D Banks Harold
*Assistant Examiner*—Oluwaseun A Adegeye
(74) *Attorney, Agent, or Firm*—Oblon, Spivak, McClelland, Maier & Neustadt, L.L.P.

(57) ABSTRACT

An after recording method comprising a first step of reading the original data including at least a video bit stream from a digital recording medium (1), a second step of decoding the original data, a third step of encoding audio data in synchronism with the decoding of the original data thereby to form a new audio bit stream, and a fourth step of writing the new audio bit stream in an area of the digital recording medium 1 corresponding to a time point substantially equal to the recording area of the original data. The sound after-recorded can be easily reproduced in accurate temporal agreement with the original image.

16 Claims, 10 Drawing Sheets

AMOUNT ACCUMULATED IN BUFFER 6

AMOUNT ACCUMULATED IN BUFFER 13

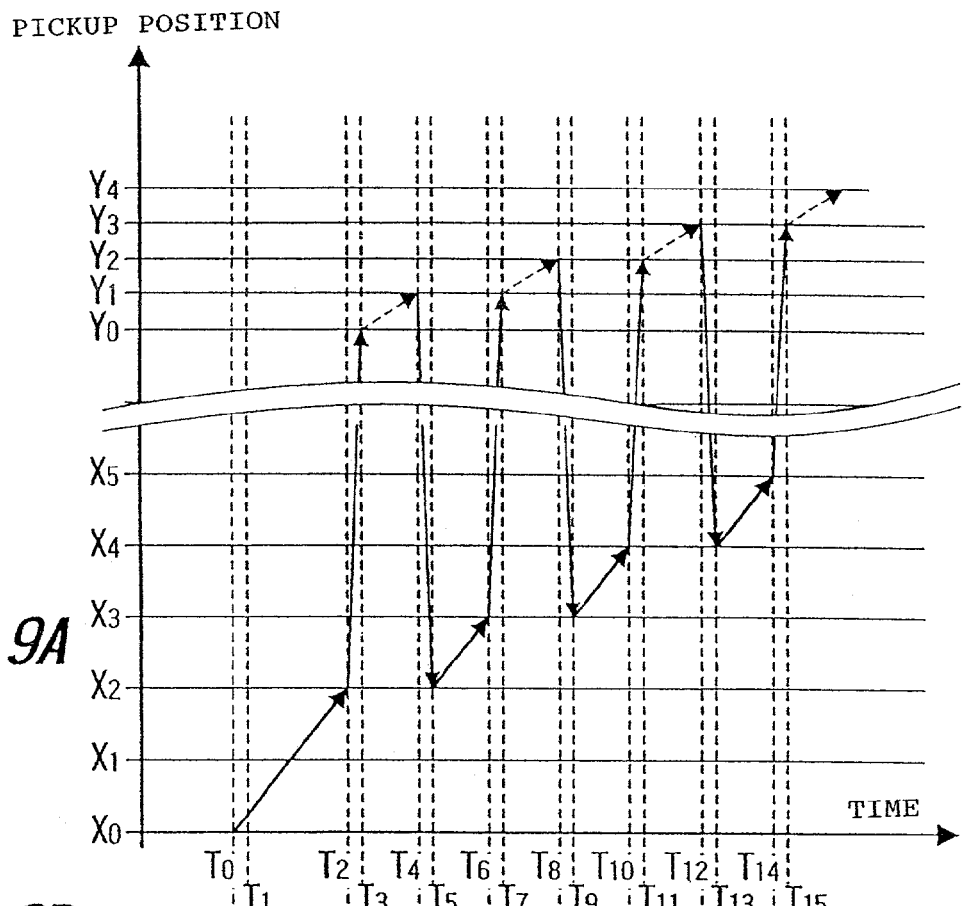
FIG. 9A
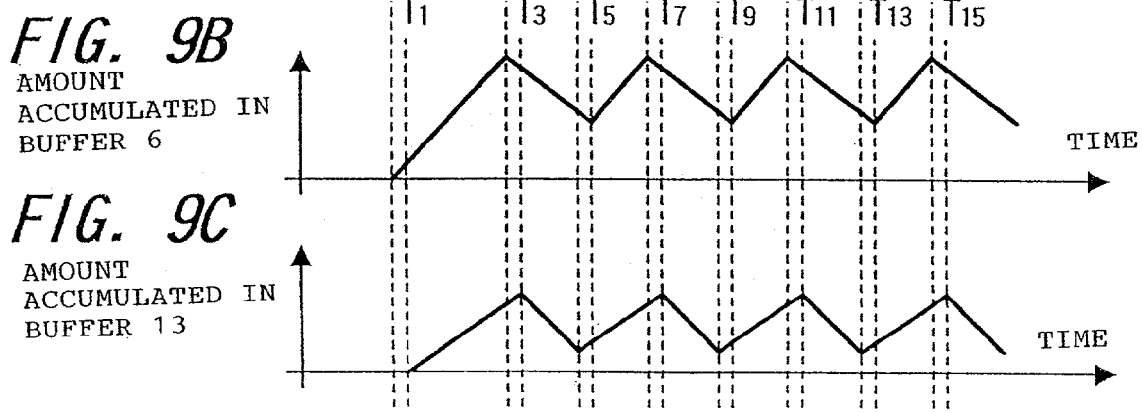
FIG. 9B
AMOUNT ACCUMULATED IN BUFFER 6
FIG. 9C
AMOUNT ACCUMULATED IN BUFFER 13

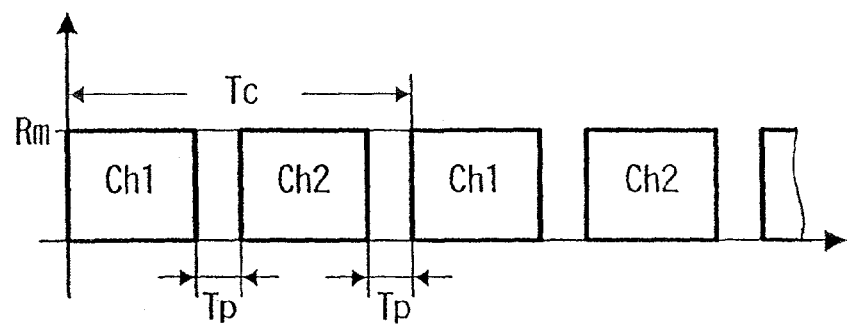
FIG. 12A
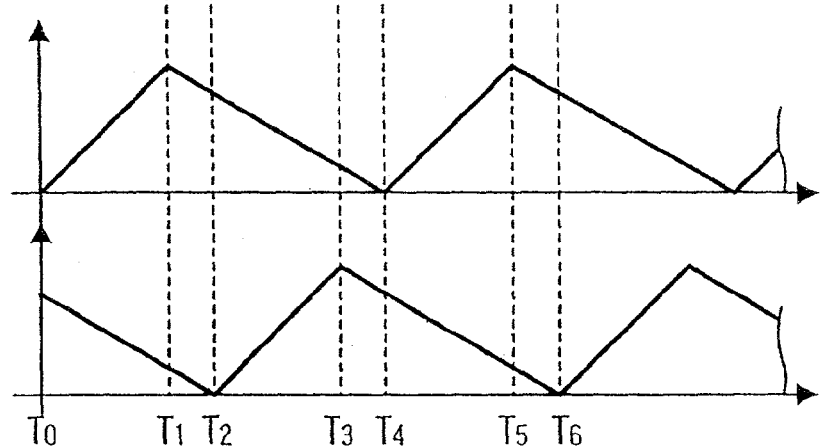
Ch1 ACCUMULATION AMOUNT
FIG. 12B
Ch2 ACCUMULATION AMOUNT
FIG. 12C

AFTER-RECORDING METHOD AND APPARATUS FOR DIGITAL RECORDING MEDIUM AND REPRODUCTION METHOD AND APPARATUS FOR THE DIGITAL RECORDING MEDIUM

This is a continuation of U.S. Ser. No. 09/297,340, filed Jul. 15, 1999 now U.S. Pat. No. 6,526,217.

TECHNICAL FIELD

The present invention relates to a method and an apparatus for after recording of video data or the like recorded in a digital recording medium.

BACKGROUND ART

The after recording (hereinafter sometimes referred to simply as AR) is a method of audio edit processing in which after the original data (only the video data, or the video data plus audio data such as voices) are recorded in a studio or location, new audio data (AR audio data) such as effect sounds are added or recorded or a part of the original audio data is replaced with the AR audio data in the editing process.

Several methods as described in (1) to (3) below, for example, are available for after recording the original data recorded in a digital recording medium. In this specification, however, the methods (1) and (3) will be explained.

(1) While reproducing the original data, the AR sound is input, and this AR audio data is multiplexed with the original data in real time at the time of reproducing the original data and recorded in the digital recording medium.

(2) While reproducing the original data, the input AR audio data are temporarily recorded in another recording medium. After that (i.e. not in real time), the AR audio data reproduced from the secondary recording medium are multiplexed and recorded with the original data in the digital recording medium.

(3) The AR audio data are recorded in the digital recording medium without being multiplexed with the original data, and at the time of reproduction, the original data read from the digital recording medium and the AR audio data are mixed and output as a final sound.

FIG. 1 shows an example of recording data (bit stream) in a digital recording medium. A video bit stream V, a primary audio bit stream A1 and a secondary audio bit stream A2 are multiplexed into a single stream and recorded. The bit rate of the audio bit stream is lower than that of the video bit stream (for example, the former is about 6 Mbps or 8 Mbps, whereas the latter is about 256 Kbps. Thus the ratio between them is about 25:1 or 32:1). As a result, a major proportion of the recording area is occupied by V, while the recording area for A1, A2 is periodically located as spots.

In the case where MPEG2 is used as a coding standard for a digital recording medium, for example, the video bit stream V compression-coded by video according to MPEG2, the primary audio bit stream A1 compression-coded by video according to MPEG2 and the secondary audio bit stream A2 compression-coded by audio according to MPEG2 are recorded in the packet multiplexing scheme by the MPEG2 system.

FIG. 2 shows an example of the process for conducting the after recording by the method (1) for the original data recorded in the digital recording medium as shown in FIG. 1. First, the video bit stream V and the primary audio bit stream A1 constituting the original data are read from a digital recording medium. After being demodulated and error corrected by a RF & demodulation circuit 21 and an ECC circuit 22, the bit streams are applied through a buffer 23 for absorbing the difference between the read rate and the decode processing rate. Then the bit streams are applied to a decoder (including a demultiplexer, a video decoder and an audio decoder) 24, so that the original image and sound are reproduced from a display and a speaker, respectively, not shown, through a video output terminal P1 and an audio output terminal P2.

The user wanting to conduct the AR operation reproduces the image and the sound in this way while inputting the AR audio data (such as the audio data generated before a microphone not shown or the audio data selectively reproduced from an AR audio library tape) by way of an audio input terminal P3. In many cases, the AR audio data actually recorded are the input AR audio data mixed with the original audio (primary audio) data in a mixer 25.

In synchronism with the reproduction of the original image and sound, the AR audio data are encoded in an encoder 26, and applied through a buffer for absorbing the difference between the encode processing rate and the write rate. Then, the correction code is added and the signal is modulated in an ECC circuit 28 and a modulation & RF circuit 29, respectively. After that, this AR audio data is written in the recording area of the secondary audio bit stream A2.

The recording area of the secondary audio bit stream A2 may have the capacity just sufficient to record the AR audio data. The audio data need not be recorded and the recording area may thus be vacant before the after recording process. In the case where the video bit stream V, the primary audio bit stream A1 and the secondary audio bit stream A2 fail to form into a correctly multiplexed bit stream (in compliance with the system specification of MPEG2) when writing the AR audio data in the vacant recording area of the secondary audio bit stream A2, then remultiplexing is necessary at the time of after recording.

The after recording process is thus completed. When reproducing images and sounds as a final product from the digital recording medium for which the after recording is completed, an arbitrary one of the original sound (primary audio bit stream A1) and the AR sound (the secondary audio bit stream A2) can be selected and reproduced.

The foregoing description for the processing assumes that only the AR audio data is written during the write operation for convenience sake. Actually, however, in view of the fact that the ECC circuit processes a predetermined size of data block as a unit, the original data is required to be rewritten at the same time that the AR audio data is written. Specifically, assuming that the packet size of the audio bit stream is 2 Kbytes while the size of the data block of the ECC circuit is 32 Kbytes or 64 Kbytes, the error correction code is required to be added in the ECC circuit 28 as data in units of 32 or 64 Kbytes covering the AR audio data and the video bit stream V recorded in the area adjacent to the recording area of the secondary audio bit stream A2 where the audio data is to be written. In this way, when writing new data in a part of the area in the digital recording medium, the error correction code is required to be added to correct the data also in the area adjacent thereto. Thus, the original data is required to be rewritten.

Incidentally, in the after recording operation performed through these processes, approximately the following processing time is consumed in each circuit after reading the video bit stream V and the primary audio bit stream A1 before writing the AR audio data.

ECC circuits 22, 28: Each about several tens of milliseconds

Buffers 23, 27: Each about several hundred milliseconds to several tens of seconds (considerably varied with the function of the buffer used)

Decoder 24: About several tens of milliseconds

Encoder 26: About several tens of milliseconds

As described above, the average time required for processing is several hundred to about several seconds (or several tens of seconds in some cases). Thus the delay problem has been posed that the AR audio data is written in an area corresponding to the reproduction time delayed the aforementioned processing time behind the area where the original data to be simultaneously reproduced is recorded. Specifically, in the case of packet multiplexing, for example, the AR audio data are recorded as packets having a time stamp indicating the time delayed behind the time indicated by the time stamp in the packets of the original data to be reproduced at the same time.

In addition, this length of the processing time is usually somewhat varied with each AR operation. Therefore, the temporal relation between the recording area of the original data and the recording area of the AR audio data is also varied with each session of after recording. As a result, in the prior art, it has been difficult to reproduce the AR audio data in complete temporal agreement with the original images or the like when reproducing the images and sounds as a final product.

Accordingly, an object of the present invention is to provide a method and an apparatus for after recording in which the AR audio data can be easily reproduced in complete temporal agreement with the original images or the like even after the processes as shown in FIG. 2 employing the AR technique of (1) above.

Another object of the invention is to provide an AR method and apparatus and an reproduction method and apparatus in which the AR audio data can be reproduced in complete temporal agreement with the original images or the like even when employing the AR technique of (3) above.

DISCLOSURE OF THE INVENTION

An AR method according to the invention is characterized by comprising, as described in claim 1, a first step of reading a bit stream from a digital recording medium, a second step of decoding the bit stream, a third step of encoding new data in synchronism with the decoding of the bit stream to form an AR bit stream, and a fourth step of writing the AR bit stream in a predetermined area of the digital recording medium.

According to this AR method, the AR bit stream obtained by encoding new data in synchronism with the decoding of the bit stream read from a digital recording medium is written in a predetermined area of the digital recording medium.

By writing the AR data in a predetermined area in this way, the temporal relation between the recording area of the original data and the recording area of the AR data is clarified. As a result, when reproducing images and sounds as a finished product, the AR data can be easily reproduced in complete temporal agreement with the original data.

Also, an AR apparatus according to this invention is characterized by comprising, as described in claim 9, read means for reading a bit stream from a digital recording medium, a decoder for decoding the bit stream, an encoder for encoding new data to form an AR bit stream, write means for writing the AR bit stream in the digital recording medium, and control means for controlling the write means in such a manner that the AR bit stream encoded by the encoder in synchronism with the decoding of the bit stream by the decoder is written in a predetermined area of the digital recording medium.

In this AR apparatus, assume that in synchronism with the decoding by the decoder of the bit stream read from the digital recording medium by the read means, new data are encoded by the encoder thereby to produce a bit stream for after recording. This AR bit stream is written in a predetermined area of the digital recording medium by the write means under the control of the control means.

In this way, by writing the AR data in a predetermined area, the temporal relation between the recording area of the original data and the recording area of the AR data is clarified. As a result, when reproducing images and sounds as a finished product, it becomes possible to reproduce the AR data in complete temporal agreement with the original data.

The AR method and apparatus described in claims 8 and 14 and the reproduction method and apparatus described in claims 15 and 18 are an example of the method and the apparatus suitable for employing the AR method described in (3) above.

According to this AR method and apparatus, information indicating the temporal correspondence between the original data and the AR data is recorded in the area of the digital recording medium for recording the additional information. In spite of the fact that the original data and the AR data are not recorded by being multiplexed, the AR data can be reproduced in complete temporal agreement with the original data based on the same information.

Also, with this reproduction method and apparatus, the information indicating the temporal correspondence between the original data and the AR data is read from the recording area of the digital recording medium for recording the additional information, and based on this information, the original data and the AR data are read out and decoded in synchronism with each other. Even in the case where the original data and the AR data are not recorded by being multiplexed at the time of after recording, therefore, the AR data and the original data are reproduced in complete temporal agreement with each other.

BRIEF DESCRIPTION OF THE DRAWINGS

FIG. 9 is a diagram showing an example of the relation between the position of the optical pickup and the read/write conditions and an example of the amount of data accumulated in a buffer.

FIG. 12 is a diagram showing an example of the read condition of an optical pickup and the amount of data accumulated in the buffer at the time of reproduction in time division.

BEST MODE FOR CARRYING OUT THE INVENTION

Figure 1:
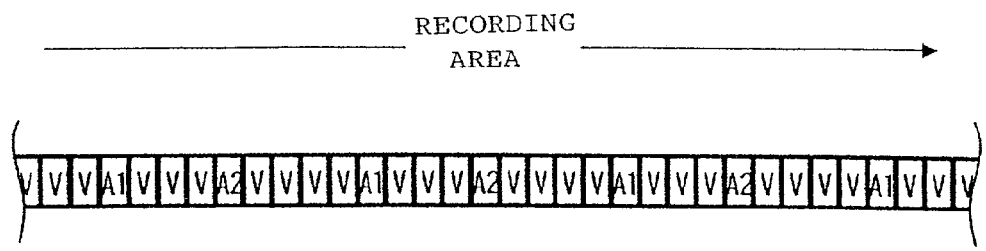
FIG. 1 is a diagram showing an example of recording data in a digital recording medium.
Figure 2:
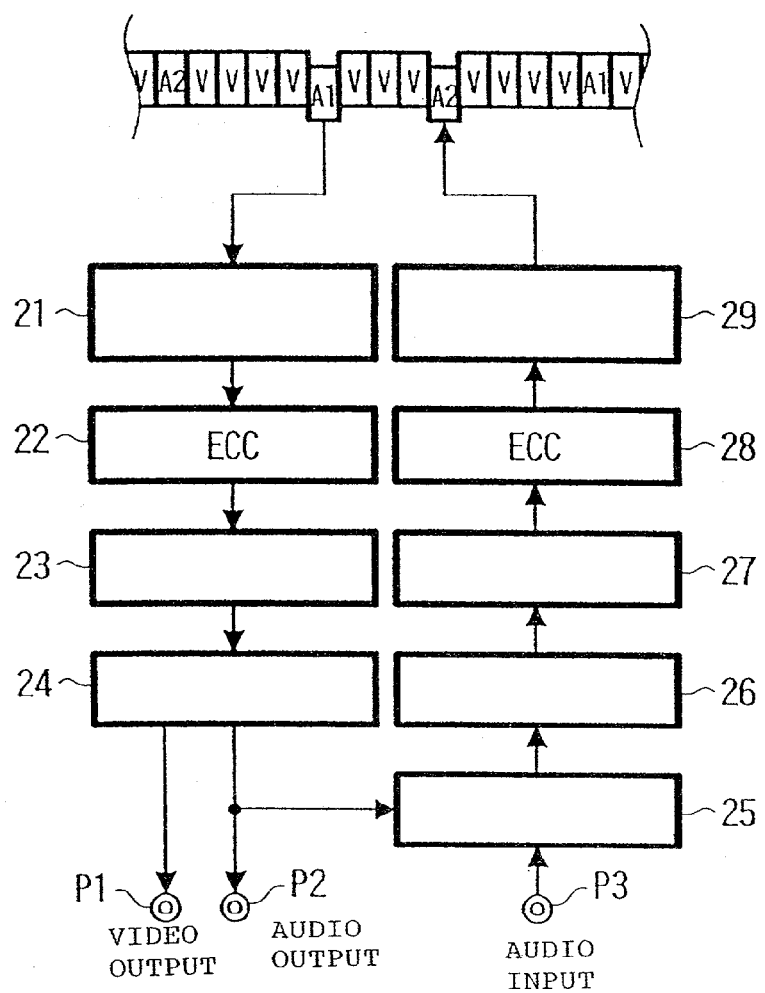
FIG. 2 is a diagram showing an example of the conventional process for after recording.

First, an example of the present invention employing the method (1) among the AR methods (1) to (3) described above will be explained (i.e. the case in which the AR sound is input while reproducing the original data, and this AR audio data is multiplexed on the original data and recorded in a digital recording medium in real time at the time of reproducing the original data).

In employing this AR method (1), the following area (A) or (B) may be determined specifically as "a predetermined area" in the digital recording medium in which the AR audio data is recorded. These areas, however, are preferred examples and are not intended to exclude other areas.

(A) Area corresponding to the reproduction time substantially identical to that for the recording area of original data This is an example of determining the area in accordance with the restrictions of the multiplexing scheme such as the MPEG system. With reference to FIGS. 5 and 6, this area can be explained as a recording area of the secondary audio bit stream A2 reproduced substantially at the same time as the primary audio bit stream A1 read in the process shown in FIG. 6. Specifically, however, it can be considered any one of the following areas (i) and (ii).

(i) The recording area of the secondary audio bit stream A2 spatially nearest to the recording area of the primary audio bit stream A1.

(ii) The recording area of the secondary audio bit stream A2 having added thereto the time information indicating substantially the same time as the time information (in MPEG system, the presentation time stamp (PTS) in the packet) added to the primary audio bit stream A1.

(B) The area corresponding to the time considerably delayed behind the recording area of the original data.

This is an example in which the area is determined without regard to the system restrictions of the multiplexing scheme.

In the case where the AR data are written in the area (A), the data channel for reading the original data from a digital recording medium is required in addition to the data channel for writing the AR data in the digital recording medium. Therefore, a method is required in which the read and write operations are performed independently of each other by providing two types of heads for read and write operations, or a method in which one type of head is caused to perform the seek operation so that read and write operations are performed in time division (the latter method is of course limited to the case of after recording the original data recorded in a recording medium of random access type like a disk).

This method is the same as the method in which data are input/output in multichannels as in an ordinary recording/reproduction apparatus. In view of the fact that the channels are as few as two and two types of heads are sufficient even for accomplishing independent read and write operations and that even in the case of performing read and write operations in time division, it is sufficient to cause the heads to perform the seek operation only by a distance corresponding to the magnitude of the delay (the full-stroke seek operation is not required), and the distance covered by the seek operation is comparatively small. The conditions for realizing these methods, therefore, are not so severe as in ordinary methods involving multichannels.

In the case where AR data are written in the area (B), on the other hand, it is sufficient to read the original data with a single head and then write AR data at the present position of the head. Thus, the latter is easier to realize as far as the reduction in the number of head types and the simplification of head control are concerned.

In this case, however, the process is required for reproducing the AR data in temporal agreement with the original data at the time of video and audio reproduction for producing a finished product. This process is complicated especially at the time of special reproductions such as slow reproduction or double-speed reproduction. Also, this process leads to an increased system cost. From these points of view, therefore, the write operation in the area (A) is considered more desirable.

For this reason, the description that follows will refer to the case of writing in the area (A) as a specific example.

Figure 3:
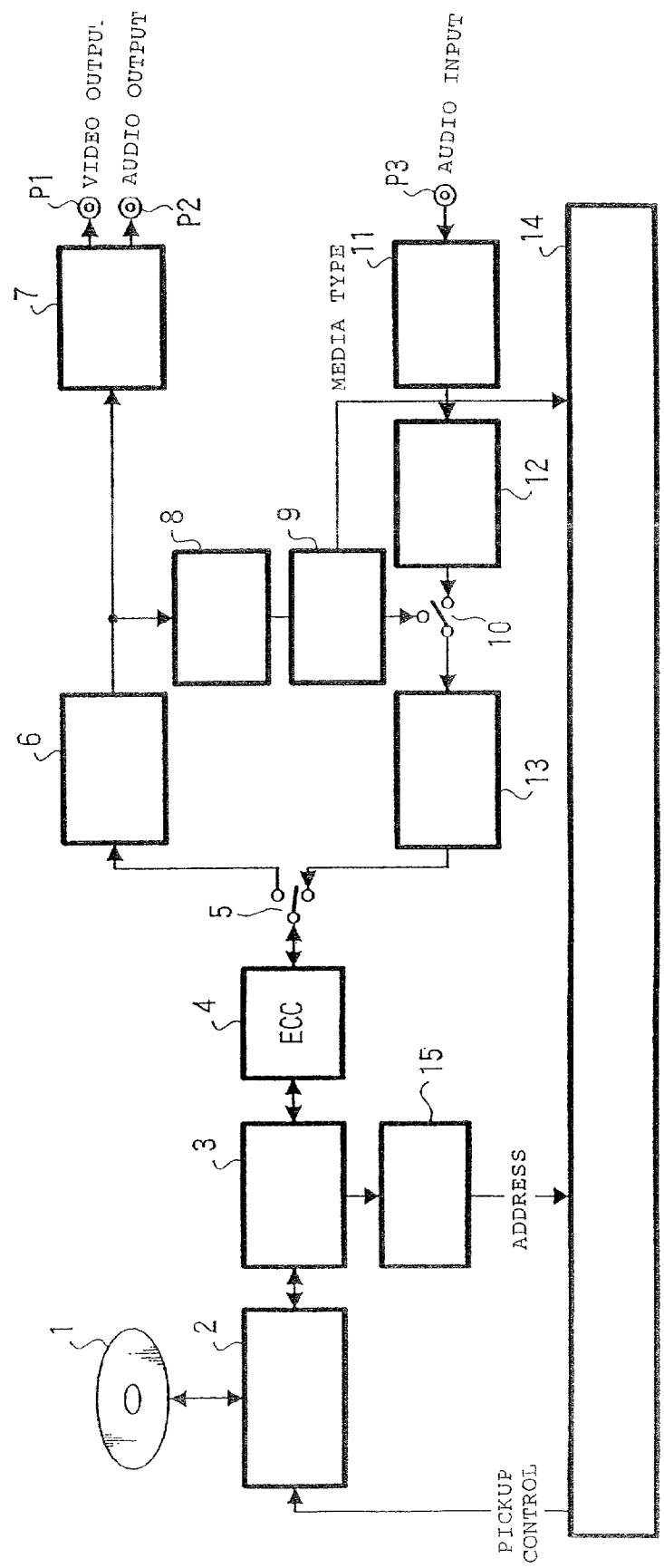
FIG. 3 is a block diagram showing an example of the system configuration of an optical disk apparatus to which the present invention is applied.

FIG. 3 shows an example of system configuration of an optical disk apparatus to which the AR method and apparatus according to the invention employing the AR method of (1) is applied.

In this optical disk apparatus, a type of an optical pickup (optical head) 2 is provided for one rewritable optical disk 1. This optical pickup 2 is used for both reading and writing the data. The optical disk 1, like in the case of FIG. 5, has recorded therein the video bit stream V, the primary audio bit stream A1 and the secondary audio bit stream A2 by a packet multiplexing scheme according to the MPEG2 system. In each of the bit streams V, A1 and A2, a packet having a presentation time stamp is inserted for each several packets.

The bit stream read from the optical disk 1 by the optical pickup 2 is demodulated and error corrected by a RF & modem circuit 3 (having the functions of both the RF & demodulation circuit 21 and the modulation & RF circuit 29 of FIG. 6 at the same time) and an ECC circuit 4 (having the functions of both the ECC circuit and the ECC circuit 28 of FIG. 6 at the same time), respectively. After that, the data are sent to a read channel buffer 6 for absorbing the difference between the read rate and the decode processing rate through a switch 5.

The bit stream retrieved from the read channel buffer 6 is decoded in a decoder (including a demultiplexing unit, a video decoder and an audio decoder) 7, and reproduced by being sent from a video output terminal P1 and an audio output terminal P2 to a display and a speaker not shown while at the same time being applied to a bypass buffer 8. The bypass buffer 8 has the function of accumulating the bit streams read from the optical disk 1 after the decode operation and enabling them to be rewritten in the optical disk 1.

The bit stream retrieved from the bypass buffer 8 are sent to one of the fixed contacts of a switch 10 through a detector 9 for detecting the type of medium (video, primary audio or secondary audio) of the packet based on the stream ID of each packet.

The audio data input from the audio input terminal P3, on the other hand, is encoded in the encoder 11 and then accumulated in the encoder buffer 12. The audio data produced from the encoder buffer 12 is sent to the other fixed contact of the switch 10.

The movable contact of the switch 10 is connected to a write channel buffer 13 for absorbing the difference between the encode processing rate and the write rate. The data sent to the write channel buffer 13 through the switch 10 (the bit stream retrieved from the bypass buffer 8 or the audio data retrieved from the encoder buffer 12) are retrieved from the write channel buffer 13, and after having added thereto an error correction code and being modulated in the ECC circuit 4 and the RF & modem circuit 3, respectively, through the switch 5, are written in the optical disk 1 by the optical pickup 2.

As an example, the read rate and the write rate have the same size (or both the read and write rates are variable and their maximum rates are equal).

Also with this optical disk apparatus, for the reason described with reference to FIG. 6, the processing time of about several hundred milliseconds to several seconds is required from the time point when the bit stream is read from the optical disk 1 to the time point when the audio data input in synchronism with the reproduction thereof is written in the optical disk 1.

Figure 4:
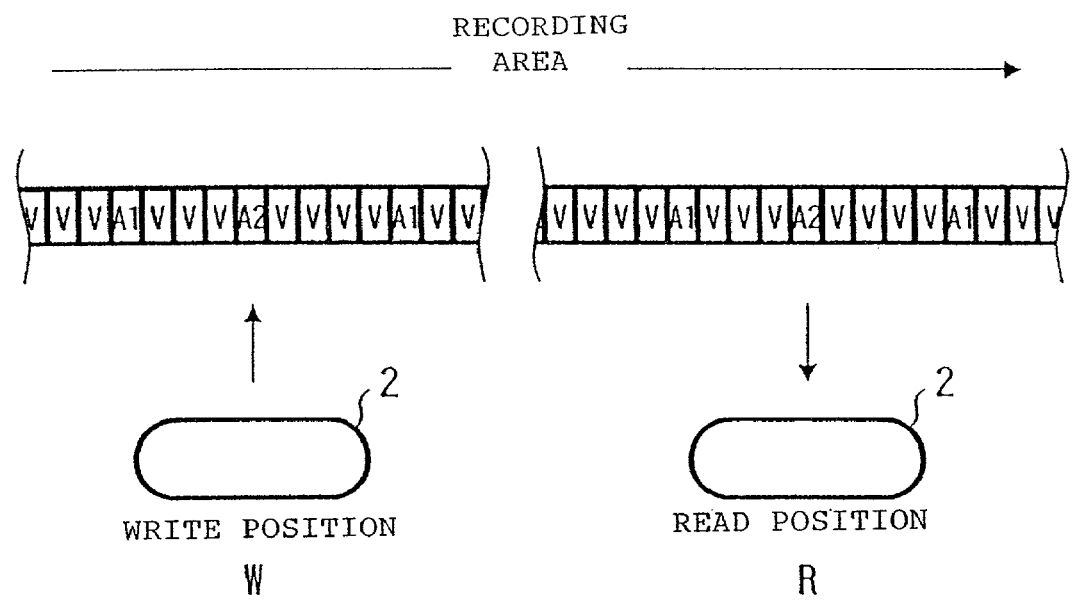
FIG. 4 is a diagram showing an example of the relation between the read position and the write position of an optical pickup.

During this period from the read to write operations, the position of the optical pickup 2 leads the position of the optical disk 1 by an amount equal to the processing time. In other words, based on a reference time point, the position w where the optical pickup 2 is required to exist for writing data in the area corresponding to the reproduction time substantially equal to the recording area of the data read out, as shown in FIG. 4, is located the particular processing time behind the read position R of the optical pickup 2 at the particular time point.

Returning to FIG. 3, the system controller 14 is for controlling the operation of each part of the optical disk apparatus for AR operation as described later. Though not shown, the controller 14 includes a CPU, a ROM for storing the processing program to be executed by the CPU and a RAM for temporarily storing the data generated in the process. Of these control operations, the fine adjustment of the position of the optical pickup 2 is carried out based on the result of detection of the address detection circuit 15 for detecting the address information of the data being read by retrieving the bit stream demodulated in the RF & modem circuit 3. Also, the switching control of the switch 10 is performed based on the detection result of the detector 9.

Now, an explanation will be given of an example of the process executed by the system controller 11 at the time of after recording.

[First Step]

First, the original data to be after recorded is designated by the user operating the operation panel not shown or the designation information of the original data to be after recorded written in the optical disk 1 in advance are read. Base on the designation or the read operation, the range of the original data recorded in the optical disk 1 and to be after recorded is established.

Then, based on the address information of the original data to be after recorded, the optical pickup 2 is caused to seek the read starting position X0. The optical pickup 2, the RF & modem circuit 3 and the ECC circuit 4 are set in read mode while at the same time turning the switch to the read channel buffer 6 side. After the position of the optical pickup 2 is finely adjusted, the read operation with the optical pickup 2 is started. In this way, the original data to be after recorded is accumulated in the read channel buffer 6.

Figure 5A:
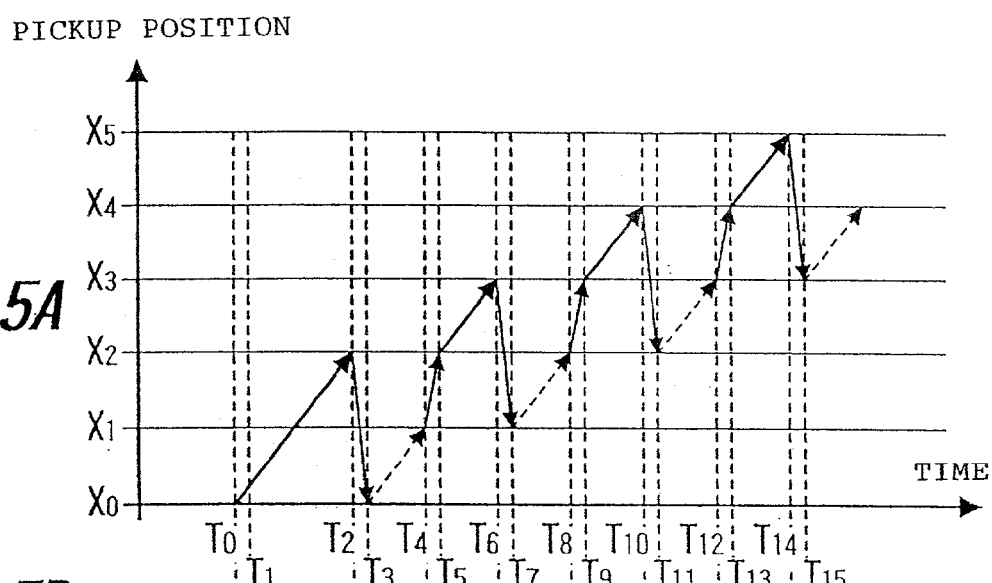
FIG. 5 is a diagram showing an example of the relation between the position of the optical pickup and the read/write conditions and an example of the amount of data accumulated in a buffer.
Figure 5B:
Figure 5C:
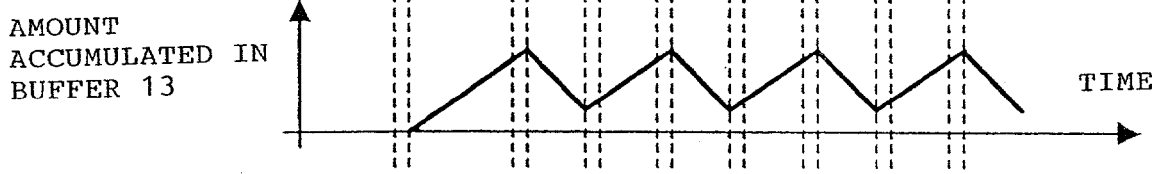
Figure 6:
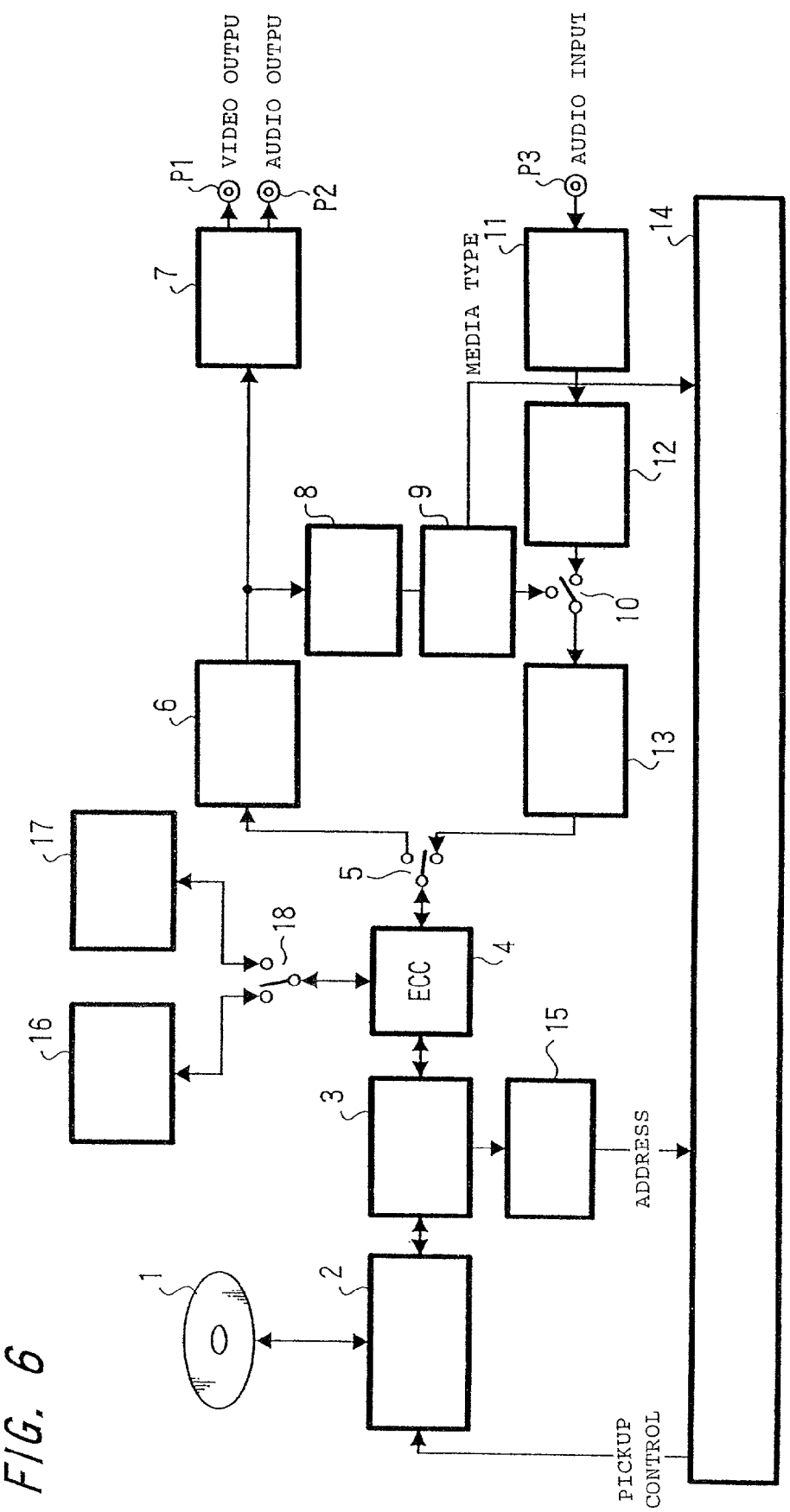
FIG. 6 is a block diagram showing another example of the system configuration of an optical disk apparatus to which the present invention is applied.

FIG. 5 shows the relation between the position of the optical pickup 2 and the read/write condition at each time of the after recording operation (FIG. 5A), and also the amount of data accumulated in the read channel buffer 6 and the write channel buffer 13 at these time points (FIGS. 5B, 5C). In FIG. 5A, the thick solid lines indicate that the data are being read, the dashed lines indicate that the write operation is going on, and the thin solid lines indicate that the seek operation is going on.

In FIG. 5, the process for accumulating in the read channel buffer 6 corresponds to the stage from time point T0 to T2, and the diagram shows the manner in which the amount of data accumulated in the read channel buffer 6 increases.

[Second Step]

The original data are retrieved from the read channel buffer 6 and reproduced by being decoded in the decoder 7, while at same time accumulating them in the bypass buffer 8.

The decoding process in the decoder 7 is continued until the end of the AR operation regardless of the position of the optical pickup 2 or regardless of whether the read mode or the write mode is prevailing.

This decoding process is started between time point T0 and time point T1 in the case of FIG. 5.

[Third Step]

The AR audio data input by the user in synchronism with the reproduction of the original data are encoded in the encoder 11 and accumulated in the encoder buffer 12.

The encoding process in the encoder 11 is continued until the end of the AR operation regardless of the position of the optical pickup 2 or regardless of whether the read mode or the write mode is prevailing.

[Fourth Step]

The original data are retrieved from the bypass buffer 8 and sent to the detector 9.

When the detection result in the detector 9 indicates that the original data being currently retrieved from the bypass buffer 8 is the video bit stream or the primary audio bit stream A1, the movable contact of the switch 10 is turned to the fixed contact on the detector 9 side so that the original data are accumulated in the write channel buffer 13.

When the result of detection by the detector 9 indicates that the original data being currently retrieved from the bypass buffer 8 is the secondary audio bit stream A2, on the other hand, the movable contact of the switch 10 is turned to the fixed contact on the encoder buffer 12 side, so that the AR audio data retrieved from the encoder buffer 12 are accumulated in the write channel buffer 13. At the same time, the secondary audio bit stream A2 are retrieved from the bypass buffer 8 and continue to be sent to the fixed contact on the detector 9 side. As a result, the write channel buffer 13 comes to ignore the secondary audio bit stream A2.

Thus, among the video bit stream V, the primary audio bit stream A1 and the secondary audio bit stream A2 constituting the original data, the secondary audio bit stream A2 is replaced by the AR audio data. In this way, the bit stream made up of a combination of the original data and the AR audio data are accumulated in the write channel buffer 13.

The process for accumulating in the write channel buffer 13 is continued until the end of AR operation regardless of the position of the optical pickup 2 or regardless of whether the read mode or the write mode is prevailing.

The process for accumulation in the write channel buffer 13 corresponds to the stage at and subsequent to the time point T1 in FIG. 5.

Then, at the time point when predetermined conditions depending on one or a combination of not less than two of the following factors (a) to (f) are satisfied, the operation of reading the original data is stopped and the switch 5 is turned to the write channel buffer 13 side.

(a) The time elapsed from the start of the read operation
(b) The data amount accumulated in the read channel buffer 6
(c) The data amount accumulated in the read channel buffer 13
(d) The media rate (rate of reading from or writing into the optical disk 1)
(e) The data rate for the read channel and the write channel (the consumption rate of the decoder 7 and the output rate of the encoder 11)
(f) The capacity of the buffers 6, 13

Then, the address information of the last original data sent to the read channel buffer 6 are stored. (In resuming the read operation, the original data following the last data sent to the buffer 6 are read from the optical disk 1 based on the address information.)

The switching operation of the switch 5 corresponds to the stage of time point T2 in FIG. 5.

Then, based on the information stored in the system controller 14 in advance, the seek operation of the optical pickup 2 is performed to the write start position (the same position X0 as the read start position in this case) from the present position X2, and when it approaches the position X0, the position of the optical pickup 2 is finely adjusted.

This seek operation corresponds to the stage from time point T2 to time point T3 in FIG. 5. Take the case of FIG. 4 as an example. This seek operation changes the position of the optical pickup 2 from R to W.

Then, the optical pickup 2, the RF & modem circuit 3 and the ECC circuit 4 are switched to the write mode, and the data are retrieved from the write channel buffer 13. As a result, the original data read from the optical disk in which the secondary audio bit stream A2 has been replaced with the AR audio data, after having added thereto the error correction code again, is written in an area substantially equal to the initial recording area on the optical disk 1. In other words, the AR audio data to be reproduced simultaneously with the original data constituting the video bit stream V and the primary audio bit stream A1 is multiplexed and recorded in the area of the secondary audio bit stream A2 corresponding to the reproduction time substantially equal to the recording area of the original data.

This write process corresponds to the stage of time point T3 to T4 in FIG. 5, which indicates the manner in which the amount of data accumulated in the write channel buffer 13 is reduced.

Then, at the time point when predetermined conditions depending on the time elapsed from the write start time and one or a combination not less than two of the factors (b) to (f) described above are satisfied, the operation of writing data into the optical disk 1 is stopped, and the switch 5 is again turned to the read channel buffer 6 side. Thus the address information of the last data written is stored. (When resuming the write operation, the data following the last data written is retrieved from the write channel buffer 13 based on this address information.)

The turning of this switch 5 corresponds to the stage of time T4 in FIG. 5.

The process up to step 4 ends one cycle of the AR operation.

Then, based on the address information stored when the switch 5 is turned to the write channel buffer 13 side previously, the optical pickup 2 is caused to perform the seek operation from the present position X1 up to the position X2 where the previous read operation stopped.

This seek operation corresponds to the stage of time point T4 to T5 in FIG. 5. Take the case of FIG. 4 as an example. This seek operation changes the position of the optical pickup 2 from W to R. In this way, the optical pickup reciprocates between the read position and the write position.

The optical pickup 2, the RF & modem circuit 3 and the ECC circuit are again set in read mode, and after the position of the optical pickup 2 is finely adjusted, the read operation by the optical pickup 2 is resumed. After that, until the write operation of the AR data corresponding to the original data to be after recorded is entirely completed (or until the end of the AR operation is designated by the user through an operation panel not shown), the read and write operations described above are continued in time division as shown in the stage at and subsequent to time point T5 in FIG. 5.

Although the detector 9 is provided in the stage subsequent to the bypass buffer 8 in the example of FIG. 3, it may alternatively be provided in the stage before the bypass buffer 8 or the type of the medium for the packet can be detected by the decoder 7. In that case, however, the relation between the detection result and the data accumulated in the bypass buffer 8 is required to be stored in the system controller 14.

As another alternative, a detector may be inserted for detecting not only the medium type but also the reproduction time of each packet based on the presentation time stamp contained in the packet. By doing so, the process for recording the AR audio data in the area corresponding to the reproduction time substantially equal to the recording area of the video bit stream V and the primary audio bit stream A1 can be performed with a higher accuracy.

Also, in place of the above-mentioned combination of the detector and the switch 10, a multiplexer may be provided for multiplexing the original data retrieved from the bypass buffer 8 with the AR audio data retrieved from the encoder buffer 12. By doing so, the multiplex operation can be performed with a higher efficiency and a higher accuracy with a configuration different from the initial one for the original data.

FIG. 6 shows another example of the system configuration of an optical disk apparatus to which the AR method and apparatus according to the invention are applied employing the AR scheme of (1) described above. In this diagram, the same component parts are designated by the same reference numerals, respectively, as in FIG. 3 and will not be described again.

This optical disk apparatus comprises two types of work memories 16, 17, as work memories, for the ECC circuit 4, and the data supplied to the ECC circuit 4 are stored in one of the work memories 16, 17 through a switch 18. (The optical disk apparatus of FIG. 3, in contrast, comprises only one type of work memory, though not shown, for the ECC circuit 4)

The process executed by the system controller 14 at the time of after recording in this optical disk apparatus is different from the process in the optical disk apparatus of FIG. 3 in the following points. The other points, however, coincide with those of the process in the optical disk apparatus shown in FIG. 3.

[Difference in Read Mode]

The original data read from the optical disk 1 and supplied to the ECC circuit 4 are stored in the work memory 16, for example, through the switch 18.

When turning the switch 5 to the write channel buffer 13 side after satisfying predetermined conditions depending on one or a combination of not less than two of the factors (a) to (f) described above, the switch 18 is turned to the work memory 17 side.

When storing the address information by stopping the reading of the original data, not the address information of the last original data sent to the read channel buffer 6 but the address information of the last original data sent to the work memory 16 is stored.

[Difference in Write Mode]

When turning the switch 5 to the read channel buffer 6 side after satisfying predetermined conditions depending on one or a combination not less than two of the factors (a) to (f) described above, the switch 18 is again turned to the work memory 16 side.

The advantage of this operation follows.

The processing of the optical disk apparatus shown in FIG. 3 is performed by the ECC circuit 4 in units of a predetermined size of data block. Therefore, the data that are input to the ECC circuit 4 but have not reached the size of the data block are unavoidably discarded by the ECC circuit 4 at the time of operation of the switch 5. Thus, at the time of resuming the read operation, the discarded data must be read again from the optical disk 1, and also at the time of resuming the read operation, the discarded data is required to be retrieved again from the write channel buffer 13 very inefficiently.

In the processing of the optical disk apparatus according to FIG. 6, in contrast, the data that are input to the ECC circuit 4 but have not reached the size of the data block at the time of read or write operation are held as they are in the work memories 16, 17 even after turning the switch 5. At the time of resuming the read operation, therefore, it is sufficient to read the data following the data held in the work memory 16 from the optical disk 1 at the time of resuming the read operation. Also, at the time of resuming the write operation, it is sufficient to retrieve the data following the data held in the work memory 17 from the write channel buffer 13. In this way, the AR operation can be performed efficiently.

Figure 7:
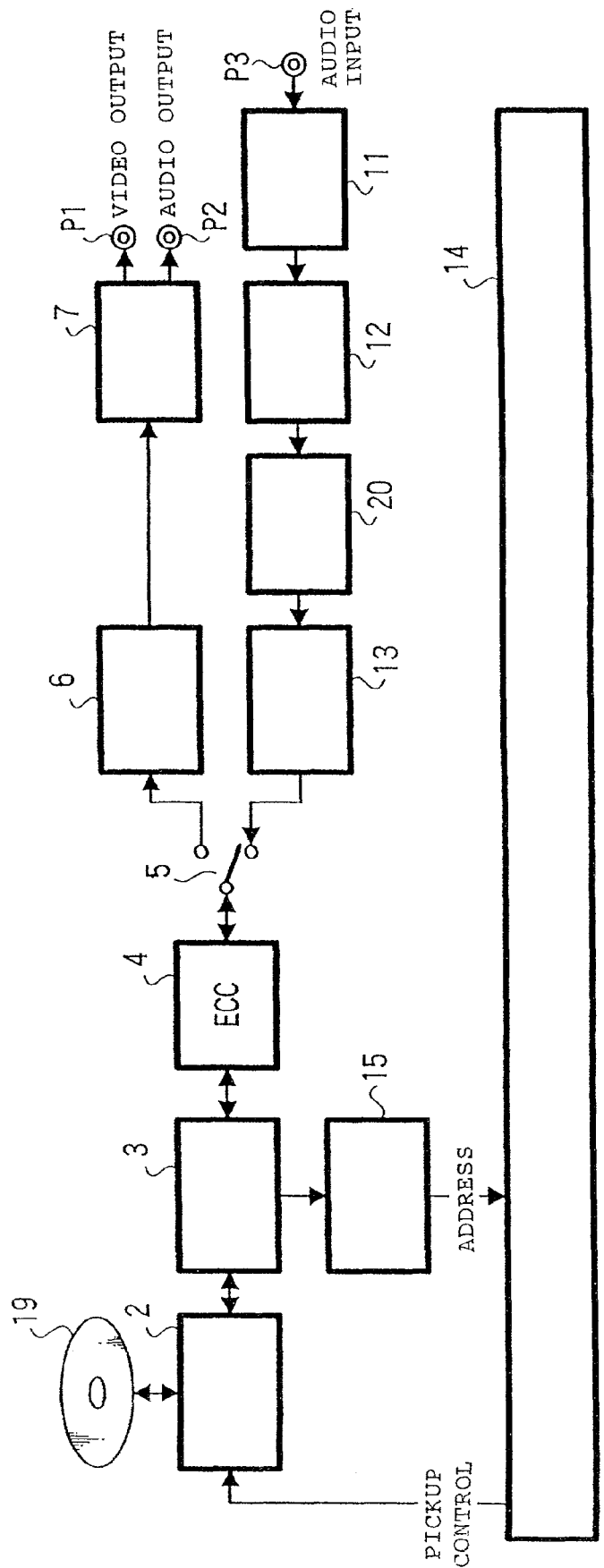
FIG. 7 is a block diagram showing an example of the system configuration of an optical disk apparatus to which the present invention is applied.

Now, the operation will be explained of an example of the present invention representing the case where the scheme (3) among the AR schemes (1) to (3) described above is employed (i.e. the case where the AR audio data are recorded in a digital recording medium having original data recorded therein, without being multiplexed with the original data, and the original audio data and the AR audio data read from the digital recording medium are mixed with each other and output as a finished sound at the time of reproduction), FIG. 7 shows an example of the system configuration of an optical disk apparatus to which the after recording method and apparatus according to this invention are applied employing the AR scheme of (3). In this diagram, the same component parts as those in FIG. 3 are designated by the same reference numerals, respectively, and will not be explained again.

Figure 8:
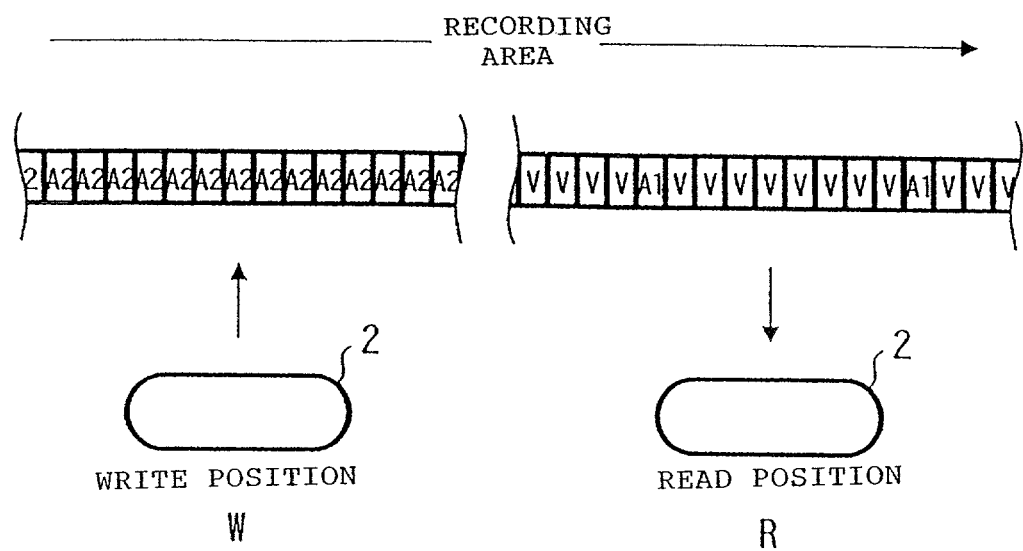
FIG. 8 is a diagram showing an example of the relation between the read position and the write position of an optical pickup.

In this optical disk apparatus, one type of an optical pickup (optical head) 2 is provided for one rewritable optical disk 19, and this optical pickup 2 is used for both reading and writing the data. The optical disk 19 has recorded therein, as shown in FIG. 8, a video bit stream V, a primary audio bit stream A1 and a secondary audio bit stream A2. The video bit stream V and the primary audio bit stream A1 constituting the original data are recorded in the form multiplexed in packets by packet multiplexing according to the MPEG2 scheme, is recorded independently (the portion indicated by W) of the bit streams V and A1. Each of the bit streams V, A1 and A2 has one packet having a presentation time stamp for each several packets.

The bit stream read from the optical disk 19 by the optical pickup 2 is demodulated and error-corrected in a RF & modem circuit 3 (having the functions of both the RF & demodulation circuit 21 and the modulation & RF circuit 29 in FIG. 6) and an ECC circuit 4 (having the functions of both the ECC circuit 22 and the ECC circuit 28 in FIG. 6), respectively, after which the bit stream is sent to a read channel buffer 6 for absorbing the difference between the read rate and the decode processing rate through a switch 5.

The bit stream retrieved from the read channel buffer 6 is decoded in a decoder (including a demulitiplexing unit, a video decoder and an audio decoder) 7, and sent from a video output terminal P1 and an audio output terminal P2 to and reproduced by a display and a speaker not shown, respectively.

The audio data input from the audio input terminal P3, on the other hand, is accumulated in an encoder buffer 12 after being encoded in an encoder 11. The audio data retrieved from the encoder buffer 12 is sent through a multiplexer 20 to a write channel buffer 13.

The data sent to the write channel buffer 13 (the audio data produced from the encoder buffer 12) is produced from the write channel buffer 13, and through a switch 5, has added thereto an error correction code and is modulated in the ECC circuit 4 and the RF & modem circuit 3, respectively. Then, the data is written into the optical disk 19 by the optical pickup 2.

In the case of this example, the read rate and the write rate are usually different from each other. Specifically, the read rate is the bit rate of a stream in which the video and audio data are multiplexed, while the write rate is the bit rate of a stream composed of audio data alone. Therefore, the read rate is expected to be higher than the write rate.

Also in this optical disk apparatus, for the reason described above with reference to FIG. 6, the processing time of about several hundred milliseconds to several seconds is required from the time point when the bit stream is read from the optical disk 19 to the time point when the audio data input in synchronism with the reproduction is written in the optical disk 19.

As a result, during this period from the read operation to the write operation, the position of the optical pickup 2 relative the position of the optical disk 19 is advanced by the time equal to the particular processing time. In this example, however, as described later, the bit stream constituting the original data is written in the portion R in FIG. 8 while the AR audio data is written in the portion W in FIG. 8. The two portions are different bit streams independent of each other and therefore no delay need be taken into account. Specifically, although there occurs a time difference between the data being read and the data being written, by an amount equal to the delay due to the signal processing, this delay has no effect on the recording operation at all.

As described later, however, the temporal relation between the bit stream constituting the original data and the bit stream of the AR audio data is recorded in the area of TOC in the optical disk 19.

Returning to FIG. 7, a system controller 14 is for controlling the operation of each part of the optical disk apparatus at the time of AR operation. Though not shown, it includes a CPU, a ROM for storing a processing program to be executed by the CPU and a RAM for temporarily storing the data generated in the process. By the way, of these control operations, the fine adjustment of the position of the optical pickup 2 is carried out based on the result of detection by the address detection circuit 15 for retrieving the bit stream demodulated in the RF & modem circuit 3 and detecting the address information of the data currently being read.

Now, an explanation will be given of an example process executed by the system controller 14 at the time of AR operation.

[First Step]

First, the original data to be after recorded is designated by the user operating an operation panel not shown or the information for designating the original data to be after recorded which is written in the optical disk 19 in advance is read out. Then, based on the designation or the designation information, the range of the original data to be after recorded which is recorded in the optical disk 19 is established.

Then, based on the address information of the original data to be after recorded, the optical pickup 2 is caused to seek the read start position X0. Then, the optical pickup 2, the RF & modem circuit 3 and the ECC circuit 4 are set in read mode. At the same time, the switch 5 is turned to the read channel buffer 6 and, after fine adjustment of the position of the optical pickup 2, the read operation by the optical pickup 2 is started. As a result, the original data to be after recorded is accumulated in the read channel buffer 6.

FIG. 9 shows the relation (FIG. 9A) between the position of the optical pickup 2 and the read/write condition at each time point of the AR operation, and the amount of data accumulated (FIGS. 9B, 9C) in the read channel buffer 6 and the write channel buffer 13 at the same time point. By the way, in FIG. 9A, the thick solid lines indicate the read operation going on, the dashed lines indicate the write operation going on, and the thin solid lines indicate the seek operation going on.

In FIG. 9, the process of accumulation in the read channel buffer 6 corresponds to the stage from time point T0 to T2, and the diagram shows the manner in which the amount of data accumulated in the read channel buffer 6 increases.

[Second Step]

The original data are retrieved from the read channel buffer 6 and reproduced by being decoded in the decoder 7.

The decoding process in the decoder 7 is continued until the end of the AR operation regardless of the position of the optical pickup 2 and also regardless of whether the read mode or write mode is prevailing.

This decoding process is started between the time point T0 and the time point T1 as far as FIG. 9 is concerned.

[Third Step]

The AR audio data input by the user in synchronism with the reproduction of the original data are encoded by the encoder 11 and accumulated in the encoder buffer 12.

The encoding process in the encoder 11 is continued until the end of the AR operation regardless of the position of the optical pickup 2 and regardless of whether the read mode or the write mode is prevailing.

[Fourth Step]

The AR audio data retrieved from the encoder buffer 12 are accommodated in packets of the multiplexer 20 conforming with the MPEG2 system standard and accumulated in the write channel buffer 13.

As a result, a bit stream temporally corresponding to the original data is generated and accumulated in the write channel buffer 13.

The process of accumulation in the write channel buffer 13 is continued until the end of the AR operation regardless of the position of the optical pickup 2 and regardless of whether the read mode or the write mode is prevailing.

This accumulation process in the write channel buffer 13 corresponds to the stage at and subsequent to time point T1 in FIG. 9.

Then, at the time point when predetermined conditions depending on one or a combination of not less than two of the following factors (a) to (f) are satisfied, the operation of reading the original data is stopped and the switch 5 is turned again to the write channel buffer 13 side.

(a) Time elapsed from the start of read operation
(b) Amount of data accumulated in read channel buffer 6
(c) Amount of data accumulated in write channel buffer 13
(d) Media rate (rate of reading/writing from and to optical disk 19)
(e) Data rate of read channel and write channel (consumption rate of decoder 7 and output rate of encoder 11)
(f) Capacity of buffers 6, 13

Then, the address information of the last original data sent to the read channel buffer 6 is stored. (When resuming the read operation, the original data following the last data sent to the buffer 6 is read from the optical disk 19 based on the particular address information.)

This operation of the switch 5 corresponds to the stage at time point T2 in FIG. 9.

Then, based on the information stored in advance in the system controller 14, the optical pickup 2 is caused to seek from the present position X2 up to the write start position (in this case, the position Y0 in the portion W in FIG. 8 representing the recording position of the secondary audio bit stream A2, not overlapped with the portion R in FIG. 8 representing the recording position of the original data). When the position Y0 is approached, the position of the optical pickup 2 is finely adjusted.

This seek operation corresponds to the stage from time point T2 to T3 in FIG. 9. Take the case of FIG. 8 shown above as an example. As a result of this seek operation, the position of the optical pickup 2 changes from R to W.

Then, the optical pickup 2, the RF & modem circuit 3 and the ECC circuit 4 are switched to write mode and the data are retrieved from the write channel buffer 13. As a result, the AR audio data, after having the error correction code added thereto, are written in the optical disk 19.

This write process corresponds to the stage from time point T3 to T4 in FIG. 9, which shows the manner in which the amount of the data accumulated in the write channel buffer 13 is reduced.

Then, at the time point when predetermined conditions depending on the time elapsed from the starting the write operation and one or a combination of not less than two of the factors (b) to (f) mentioned above are satisfied, the operation of writing data into the optical disk 19 is stopped, and the switch 5 is turned again to the read channel buffer 6 side. Then, the address information of the last data written is stored. (When resuming the next write operation, the data following the last data written is retrieved from the write channel buffer 13 based on the address information.)

The switching operation of the switch 5 corresponds to the stage at time point T4 in FIG. 9.

One cycle of the AR operation is finished up to this fourth step.

Then, based on the address information stored when the switch 5 is previously turned to the write channel buffer 13 side, the optical pickup 2 is caused to perform the seek operation from the present position Y1 up to the position X2 where the previous write operation is stopped.

This seek operation corresponds to the stage from time point T4 to T5 in FIG. 9. Take the case of FIG. 8 described above as an example. This seek operation changes the position of the optical pickup 2 from W to R. In this way, the position of the optical pickup 2 reciprocates between the read position and the write position.

The optical pickup 2, the RF & modem circuit 3 and the ECC circuit 4 are again turned to read mode, and after the position of the optical pickup 2 is finely adjusted, the read operation by the optical pickup 2 is resumed. Then, until the AR data corresponding to the original data to be after recorded is completely written in its entirety (or until the user designates the end of the AR operation by operating the operation panel not shown), as seen from the stage at and subsequent to time point T5 in FIG. 9, the read and write operations as described above are performed in time division.

[Fifth Step]

As the final stage of the AR operation, the information indicating the temporal correspondence between the original data and the AR audio data is recorded in the optical disk 19.

In this case, the presentation time stamp (PTS) is utilized as an example.

Figure 10:
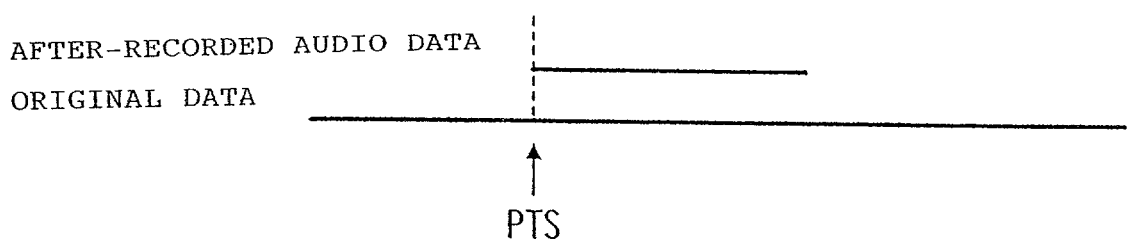
FIG. 10 is a diagram showing presentation time stamps for the portion of the original data which begins to correspond to the AR audio data.

Specifically, as described earlier, in the MPEG2 system, the packets of the bit stream of each medium have a presentation time stamp. As illustrated in FIG. 10, therefore, the temporal correspondence between the original data and the AR audio data is uniquely specified by the presentation time stamp for that portion of the video bit stream V and the primary audio bit stream A1 constituting the original data which begins to correspond to the audio bit stream A2 constituting the AR audio data (i.e. the leading part of the original data to be after recorded, designated by the user or by the designation information written in the optical disk 19.)

In view of this, when the AR audio data corresponding to the original data to be after recorded are completely written or when the user designates the end of the AR operation, then the information indicating the presentation time stamp of the portion of the original data which begins to correspond to the AR audio data is recorded by the system controller 14 in the area of the TOC (Table of Contents) of the optical disk 19.

Also, the address information for the portion of the original data which begins to correspond to the AR audio data (X0 in FIG. 9) and the address information of the starting position (Y0 in FIG. 9) and the ending position of the AR audio data are recorded in the TOC area.

As described above, as information indicating the temporal correspondence between the original data and the AR audio data, the information indicating the presentation time stamp for the portion of the original data which begins to correspond to the AR audio data is recorded in the TOC area of the optical disk 19. Therefore, in spite of the fact that the original data and the AR audio data are recorded without being multiplexed, the AR audio data can be reproduced in accurate temporal agreement with the original data based on the particular information incorporated in the TOC.

Figure 11:
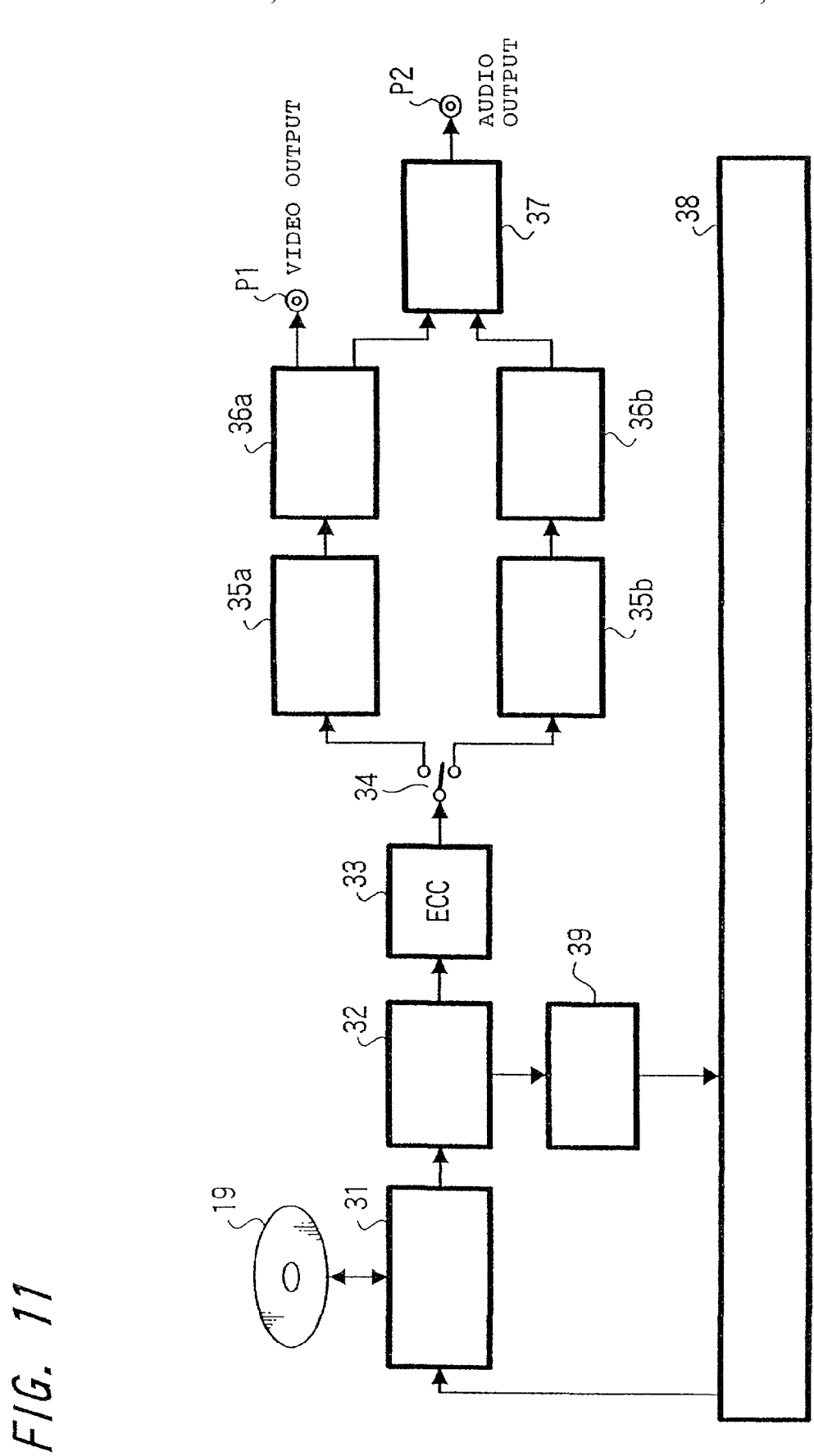
FIG. 11 is a block diagram showing another example of the system configuration of an optical disk apparatus to which the present invention is applied.

FIG. 11 shows an example of the system configuration of an optical disk apparatus to which a reproduction method and apparatus according to this invention are applied employing the AR scheme of (3) described above.

This optical disk apparatus comprises one type of optical pickup (optical head) 31 for reading data. The bit stream read by this optical pickup 31 from the optical disk mounted on the optical disk apparatus, therefore, after being demodulated and having the error thereof corrected in the RF & demodulation circuit 32 (having the function of the RF & demodulation circuit 21 of FIG. 6) and the ECC circuit 33 (having the function of the ECC circuit 22 of FIG. 6), respectively, is sent through the switch 34 to the buffer 35 (the buffer 35a of channel (Ch) 1 or the buffer 35b of channel (Ch) 2) for absorbing the difference between the read rate and the decode processing rate.

The bit stream retrieved from the Ch1 buffer 35a is decoded by a decoder (including a demultiplexer, a video decoder and an audio decoder) 36a. The video signal output from the decoder 36a is sent to a display not shown from a video output terminal P1, while the audio signal output from the decoder 36a is sent to a mixing circuit 37.

The bit stream retrieved from the Ch2 buffer 35b, on the other hand, is decoded in the decoder (including an audio decoder) 36b, and the audio signal output from the decoder 36b is sent to the mixing circuit 37.

The audio signal output from the mixing circuit 37 is sent to and reproduced by a speaker not shown from the audio output terminal P2.

Though not shown, the TOC information read from the optical disk by the optical pickup 31, after being demodulated and having the error thereof corrected by the RF & demodulation circuit 32 and the ECC circuit 23, respectively, is sent to the system controller 38.

The system controller 38 is for controlling the operation of each component part of the optical disk apparatus at the time of reproduction as described later, and through not shown, includes a CPU, a ROM for storing a processing program and the like to be executed by the CPU and a RAM for temporarily storing the data or the like generated in the process. By the way, of these control operations, the fine adjustment of the position of the optical pickup 31 is carried out based on the result of detection by the address detection circuit 39 for retrieving the bit stream demodulated in the RF & modem circuit 32 and detecting the address information of the data presently being read.

Now, an explanation will be given of an example of the process executed by the system controller 38 at the time of reproduction of the optical disk 19 (in which the AR operation has been conducted by the optical disk apparatus of FIG. 7).

[First Step]

When the optical pickup 31 is caused to read the TOC information of the optical disk 19, a collection of information is obtained including the information indicating the presentation time stamp for the portion of the original data which begins to correspond to the AR audio data, the address information for the portion of the original data (X0 in FIG. 9) that begins to correspond to the AR audio data and the address information for the starting position (Y0 in FIG. 9) and the ending position of the AR audio data.

[Second Step]

When the reproduction start position of the original data (the video bit stream V and the audio bit stream A1 in FIG. 8) is designated by the user operating the operation panel not shown, the optical pickup 31 is caused to seek the particular reproduction starting position based on the address information of the same reproduction starting position. Then the switch 34 is turned to the Ch1 buffer 35a side, and after finely adjusting the position of the optical pickup 31, the read operation by the optical pickup 31 is started.

The original data accumulated in the buffer 35a is retrieved from the buffer 35a and sent to the decoder 36a, so that the decoding process is started in the decoder 36a.

As a result, the original image is reproduced while at the same time reproducing the original sound as it is through the mixing circuit 37.

By the way, the consumption rate of the decoder 36a is smaller than the rate of reading from the optical disk 19. When the original data is accumulated up to the full capacity of the buffer 35a, therefore, the operation of reading the original data from the optical disk 19 is suspended. Subsequently, when the data are retrieved from the buffer 35a and a sufficient capacity of the buffer 35a becomes available, then the read operation of the optical disk 19 is resumed.

The reading of the original data proceeds in this way, and when reaching the portion of the original data which has the same presentation time stamp as that indicated by the information acquired in the first step (the portion X0 in FIG. 9, and the portion PTS in FIG. 10), assume that the amount of data accumulated in the buffer 35a reaches a minimum requirement (the amount of full capacity, as an example) determined from the factors (g) to (j), for example. At this time point, the operation of reading the original data is stopped, and so is the retrieval of the original data from the buffer 35a. Then the switch 34 is turned to the Ch2 buffer 35b side.

(g) The time elapsed from the arrival at the time point when the portion of the original data that has the same presentation time stamp as that indicated by the information acquired in the first step.

(h) Media rate (the rate of reading/writing from and into the optical disk 19)

(i) Ch1 and Ch2 data rates (consumption rate of the decoders 36a, 36b)

(j) Capacity of the buffers 35a, 35b

The address information of the last original data sent to the buffer 35a is stored. (When resuming the next operation of reading the original data, the original data following this last data sent to the buffer 35a is read from the optical disk 19 based on the particular address information.)

Then, based on the address information obtained in the first step, the optical pickup 31 is caused to seek from the present position up to the AR audio data starting position (Y0 in FIG. 9), and after fine adjustment of the position of the optical pickup 31, the read operation by the optical pickup 31 is started.

As a result, the AR audio data (the secondary audio bit stream A2 in FIG. 8) is sequentially accumulated in the buffer 35b.

[Third Step]

Then, at the time point when the amount of the data accumulated in the buffer 35b reaches a required minimum (the amount up to the full capacity, for example) determined by the above-mentioned factors (h) to (j) and the following factors (k) and (l), the original data and the AR audio data are retrieved from the Ch1 buffer 35a and the Ch2 buffer 35b, respectively, and sent to the decoders 36a, 36b. Thus the decoding process in the decoder 36b is also started.

(k) The time elapsed from the time point when the operation of reading the AR audio data begins (l) The amount of data accumulated in the Ch1 buffer 35a By the way, the minimum required amount of the data accumulated in the buffer 35b may be smaller than the minimum required amount of the data accumulated in the buffer 35a. This is by reason of the fact that since the operation of reading the AR audio data is still continued after starting the decoding process in the decoder 36b, the likelihood has become low of an underflow occurring in the buffer 35b.

Also, in this example, in the second step, when reaching the portion having the same presentation time stamp as that indicated by the information obtained in the first step, the retrieval of the original data from the Ch1 buffer 35a is stopped (hence, the process of decoding the original data in the decoder 36a is stopped), and the AR audio data begins to be retrieved from the Ch2 buffer 35b in the subsequent third step thereby to start the process of decoding the AR audio data in the decoder 36b. At the same time, the retrieval of the original data from the buffer 35a (and hence the process of decoding the original data in the decoder 36a) is resumed. As another example, however, in the second step, even after reaching the portion having the same presentation time stamp as that indicated by the information obtained in the first step, the retrieval of the original data from the buffer 35a may be continued (and hence the process of decoding the original data in the decoder 36a may be continued). With the decoding process continued in the decoder 36a in this way, in the third step, the retrieval of the AR audio data from the buffer 35b is started thereby to start the process of decoding the AR audio data in the decoder 36b.

[Fourth Step]

As a result, the original image is reproduced, and at the same time the original sound and the AR audio sound begin to be mixed and reproduced in the mixing circuit 37.

Then, at the time point when predetermined conditions depending on the above-mentioned factors (h) to (j), (k), (l) and the following factor (m) are satisfied, the operation of reading the AR audio data is stopped, and the switch 34 is turned again to the Ch1 buffer 35a side.

(m) The amount of data accumulated in the Ch2 buffer 35b

Then, the address information of the last AR audio data sent to the buffer 35b is stored. (The next time when resuming the operation of reading the AR audio data, the AR audio data following the particular last data sent to the buffer 35b is read from the optical disk 19 based on the particular address information.)

Then, based on the address information stored when turning the switch 34 to the Ch2 buffer 35b side previously, the optical pickup 31 is caused to seek from the present position up to the position of the original data where the previous reading operation is stopped, and after fine adjustment of the position of the optical pickup 31, the read operation by the optical pickup 31 is started.

Subsequently, until the complete end of the read operation up to the last position of the AR audio data (or until the end of the reproduction as designated by the user by way of an operation panel not shown), the operation of reading the original data and the operation of reading the AR audio data as described above continue to be performed in time division.

FIG. 12 shows an example of the read condition (FIG. 12A) of the optical pickup 31 and the amount of data accumulated (FIGS. 12B, 12C) in the Ch1 buffer 35a and the Ch2 buffer 35b in the steady state of reproduction. In FIG. 12A, Ch1 represents the period when the original data is being read, Ch2 represents the period when the AR audio data is being read, Tp represents the period when the seek operation is going on, Tc represents the repetition cycle of the time-division read operation, and Rm represents the rate of reading from the optical disk 19.

In FIG. 12, before the amount of data accumulated in the buffer 35a becomes zero at time point T0, the operation of reading the original data is resumed, and at the subsequent time T1, the operation of reading the original data is stopped. During the time from T1 to T2, the optical pickup 31 is caused to seek the recording position for the AR audio data. At the subsequent time point T2, before the amount of data accumulated in the buffer 35b becomes zero, the operation of reading the AR audio data is resumed. At the subsequent time T3, the operation of reading the AR audio data is stopped, and during the period from T3 to T4, the optical pickup 31 is caused to seek the recording position of the original data. A similar process is repeated subsequently as indicated in FIG. 12.

By the way, in FIG. 12, the relation in length between the period when the original data is being read and the period during which the AR audio data is being read, and the relation in magnitude between the amount of data accumulated in the buffer 35a and the amount of data accumulated in the buffer 35b are abstracted and plotted. However, the original data is composed of the video bit stream V and the primary audio bit stream A1, while the AR audio data is composed only of the secondary audio bit stream A2. Therefore, the period during which the original data is being read is longer than the period during which the AR audio data is being read, and the amount of data accumulated in the buffer 35a is of course larger than the amount of data accumulated in the buffer 35b.

In this way, the information indicating the presentation time stamp of the portion of the original data which begins to correspond to the AR audio data is read from the TOC area of the optical disk 19, and based on this information, the original data and the AR audio data are read in synchronism with each other for decoding. In spite of the fact that the original data and the AR audio data are recorded without being multiplexed at the time of AR operation, the AR audio data can be reproduced in accurate temporal agreement with the original data.

In each of the examples described above, the optical pickup of one type is caused to perform the seek operation for both read and write operations (or the operation of reading data of two channels) in time division. As an alternative, optical pickups of two types can be used for independent read and write operations (or data read operations of two channels).

Also, in the examples described above, the present invention is applied to an optical disk apparatus having a rewritable optical disk mounted thereon. In place of it, the present invention may be applied to a recording-reproducing apparatus having mounted thereon an appropriate rewritable disk-like recording medium such as a magnetic disk (or a digital recording medium of random access type other than the disk-like recording medium). Also, when heads of two types are provided, the present invention may be applied to a recording-reproducing apparatus having mounted thereon a digital recording medium of sequential access type such as a magnetic tape.

Further, although the present invention is applied to a recording medium in which the original data are recorded multiplexed in packets, the present invention is applicable also to a digital recording medium having the original data recorded therein by an appropriate method.

Also, in the examples described above, the audio data are after-recorded on the original data having the video bit stream V and the primary audio bit stream A1. Instead, the present invention is applicable to the case in which new data of an appropriate type is after-recorded on the original data composed of bit streams of appropriate media types. Specifically, the present invention is applicable to the case in which at least one of the audio data and the graphic data is after-recorded on the original data composed of only a video bit stream (or composed of a video bit stream and an audio bit stream), or to the case in which at least one of the video data and the graphic data are after-recorded on the original data composed only of an audio bit stream.

Also, the mixing operation at the time of reproduction employing the AR scheme (3) described above can be performed not only for the primary audio bit stream A1 and the secondary audio bit stream A2 as in the optical disk apparatus of FIG. 11 but also for the video bit stream in the original data or the video bit stream or the graphic bit stream in the AR data.

The present invention is not limited to the examples described above, but can of course employ various configurations without departing from the spirit of the invention.

As described above, with an after recording method and apparatus according to this invention, the temporal relation between the recording area of the original data and the recording area of the AR data is clarified. When reproducing images and sounds as a finished product, therefore, the AR data can be reproduced in accurate temporal agreement with the original data with ease.

Especially, with an after recording method and apparatus described in claims 8 and 14, the information indicating the temporal correspondence between the original data and the AR data is recorded in the recording area for additional information of a digital recording medium. Therefore, in spite of the fact that the original data and the AR data are recorded without being multiplexed with each other, the AR data can be reproduced in accurate temporal agreement with the original data based on the same information.

Also, with a reproducing method and apparatus described in claims 15 and 18 of the present invention, information indicating the temporal correspondence between the original data and the AR data is read from the recording area for additional information of the digital recording medium, and based on this information, the original data and the AR data are read in synchronism for decoding. Therefore, even in the case where the original data and the AR data are recorded without being multiplexed at the time of AR operation, the AR data can be reproduced in accurate temporal agreement with the original data.

DESCRIPTION OF REFERENCE NUMERALS 1, 19 Optical disk
2, 31 Optical pickup
3 RF & modem circuit
4, 33 ECC circuit
5, 10, 18, 34 Switch
6 Read channel buffer
7, 36a, 36b Decoder
8 Bypass buffer
9 Detector
11 Encoder
12 Encoder buffer
13 Write channel buffer
14, 38 System controller
15, 39 Address detection circuit
16, 17 Work memory
20 Multiplexer
32 RF and demodulation circuit
35a Ch1 buffer
35b Ch2 buffer
37 Mixing circuit

What is claimed is:

1. A method of reproducing an after-recorded digital recording medium, comprising the steps of:

reading, from a predetermined area of a digital recording medium, a presentation time stamp, the presentation time stamp indicating a time point of a first bit stream of original data that is representative of video and primary audio information that corresponds to and marks a start time of a second bit stream for after recording that is representative of secondary audio information written without being multiplexed with the first bit stream of the original data;

reading (1) first address information for a portion of the original data that begins to correspond to the secondary audio information, and (2) second address information for a starting position and an ending position of the secondary audio information;

reading the first bit stream of the original data and the second bit stream for after recording in synchronism with each other based on the presentation time stamp and the first and second address information; and decoding the first bit stream of the original data and the second bit stream for after recording.

2. The method of reproducing an after-recorded digital recording medium according to claim 1, further comprising mixing the first bit stream of the original data decoded in the decoding step with the second bit stream for after recording.

3. The method of reproducing an after-recorded digital recording medium according to claim 1, wherein the digital recording medium is a disk-like recording medium, and the second reading step is executed by use of a single read head in time division.

4. A reproduction apparatus for after-recorded digital recording medium, comprising:
   read means for reading bit streams from a digital recording medium;
   control means for causing the read means to read, from a predetermined area of the digital recording medium, a presentation time stamp, the presentation time stamp indicating a time point of a first bit stream of original data to be after recorded that is representative of video and primary audio information that corresponds to and marks a start time of a second bit stream for after recording that is representative of secondary audio information written without being multiplexed with the first bit stream of the original data;
   means for reading (1) first address information for a portion of the original data that begins to correspond to the secondary audio information, and (2) second address information for a starting position and an ending position of the secondary audio information, wherein the control means controls the read means to read the first bit stream of the original data and the second bit stream for after recording, in synchronism with each other, based on the presentation time stamp and the first and second address information; and
   a decoder configured to decode the bit streams read by the read means from the digital recording medium.

5. The reproduction apparatus for an after-recorded digital recording medium according to claim 4, wherein the decoder further includes mixing means for mixing the first bit stream of the original data decoded by the decoder with the second bit stream for after recording.

6. The reproduction apparatus for an after-recorded digital recording medium according to claim 4, wherein the digital recording medium is a disk-like recording medium, the read means is a single read head, and the control means causes the single read head to read the bit stream of the original data and the bit stream of the data for after recording means by use of time division.

7. A method of after recording in a digital recording medium, comprising:
   reading original data from a recording medium in accordance with a controller;
   accumulating the read original data in a read channel buffer and sending the accumulated original data to a decoder;
   reproducing the accumulated original data from the decoder and inputting after recording (AR) data to an encoder in synchronism therewith;
   multiplexing the encoded AR data to form data packets;
   accumulating the data packets in a write channel buffer;
   writing data corresponding to the accumulated AR data packets onto the recording medium in accordance with the controller; and
   writing, after the original data is read from the recording medium in its entirety, a presentation time stamp in a predetermined area of the recording medium, the presentation time stamp indicating a time point of the original data that marks a start time of the encoded AR data that was written onto the recording medium.

8. The method according to claim 7, further comprising switching between the step of reading and the step of writing when two or more of the following factors are simultaneously satisfied: (a) a predetermined amount of time has elapsed from a start of the read operation, (b) a predetermined amount of data has accumulated in the read channel buffer, (c) a predetermined amount of data has accumulated in the write channel buffer, (d) a predetermined rate of reading/writing from/to the recording medium has been reached, (e) a predetermined input rate for the decoder has been reached, (f) a predetermined output rate for the encoder has been reached, (g) the amount of data accumulated in the read channel buffer has reached a maximum level and (h) the amount of data accumulated in the write buffer has reached a maximum level.

9. The method according to claim 7, further comprising forming a bit stream from the AR data packets which correspond to the original data.

10. The method according to claim 9, further comprising recording an address pertaining to a start and finish of the AR data, and an address corresponding to a start of the original data in a table of contents located on the recording medium.

11. An apparatus for after recording in a digital recording medium, comprising:
    read means for reading original data from a recording medium in accordance with a controller;
    first accumulating means for accumulating the read original data in a read channel buffer and sending the accumulated original data to a decoder;
    reproduction means for reproducing the accumulated original data from the decoder and inputting after recording (AR) data to an encoder in synchronism therewith;
    a multiplexer for multiplexing the encoded AR data to form data packets;
    second accumulating means for accumulating the data packets in a write channel buffer;
    write means for writing data corresponding to the accumulated AR data packets onto the recording medium in accordance with the controller; and
    means for writing, after the original data is read from the recording medium in its entirety, a presentation time stamp in a predetermined area of the recording medium, the presentation time stamp indicating a time point of the original data that marks a start time of the encoded AR data that was written onto the recording medium.

12. The apparatus according to claim 11, wherein the controller switches between the read means and the write means when two or more of the following factors are simultaneously satisfied: (a) a predetermined amount of time has elapsed from a start of the read operation, (b) a predetermined amount of data has accumulated in the read channel buffer, (c) a predetermined amount of data has accumulated in the write channel buffer, (d) a predetermined rate of reading/writing from/to the recording medium has been reached, (e) a predetermined input rate for the decoder has been reached, (f) a predetermined output rate for the encoder has been reached, (g) the amount of data accumulated in the read channel buffer has reached a maximum level, and (h) the amount of data accumulated in the write buffer has reached a maximum level.

13. The apparatus according to claim 11, further comprising means for forming a bit stream from the AR data packets which correspond to the original data.

14. The apparatus according to claim 13, further comprising means for recording the address pertaining to a start and finish of the AR data, and an address corresponding to a start of the original data in a table of contents located on the recording medium.

15. The method of reproducing an after-recorded digital recording medium according to claim 1, wherein the digital recording medium has a recording area for a video bit stream, a primary audio bit stream, and a secondary audio bit stream, and the second bit stream for after recording is written in the recording area of the secondary audio bit stream.

16. The apparatus of reproducing an after-recorded digital recording medium according to claim 4, wherein the digital recording medium has a recording area for a video bit stream, a primary audio bit stream, and a secondary audio bit stream, and the second bit stream for after recording is written in the recording area of the secondary audio bit stream.

* * * * *

UNITED STATES PATENT AND TRADEMARK OFFICE
CERTIFICATE OF CORRECTION

PATENT NO. : 7,809,238 B2
APPLICATION NO. : 10/269360
DATED : October 5, 2010
INVENTOR(S) : Yasushi Fujinami It is certified that error appears in the above-identified patent and that said Letters Patent is hereby corrected as shown below:

On the title page, Item (63), the Related U.S. Application Data information is incorrect, and Item (30), the Foreign Application Priority Data has been omitted. Item (63) and (30) should read:

-- Related U.S. Application Data

(63)   Continuation of application No. 09/297,340, filed on Jul. 15, 1999, now Pat. No. 6,526,217 which is a 371 of PCT/JP98/03927, filed on Sep. 2, 1998. --

-- (30)   Foreign Application Priority Data

Sep. 2, 1997   (JP)................................ 9-237163 --

Signed and Sealed this
Twenty-eighth Day of December, 2010

David J. Kappos
*Director of the United States Patent and Trademark Office*